US011945295B2

(12) United States Patent
Jaradi et al.

(10) Patent No.: US 11,945,295 B2
(45) Date of Patent: Apr. 2, 2024

(54) ELECTRIC-VEHICLE BATTERY RESTRAINT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 17/675,038

(22) Filed: Feb. 18, 2022

(65) Prior Publication Data

US 2023/0264555 A1    Aug. 24, 2023

(51) Int. Cl.
*B60K 1/04*  (2019.01)
*B60R 19/00*  (2006.01)
*B60R 19/42*  (2006.01)

(52) U.S. Cl.
CPC ............. *B60K 1/04* (2013.01); *B60R 19/00* (2013.01); *B60K 2001/0438* (2013.01); *B60Y 2306/01* (2013.01)

(58) Field of Classification Search
CPC ......... B60R 19/42; B60R 21/34; B60R 21/36; B60R 2021/138; B60R 21/23138; B60K 1/04; B60K 2001/0438
See application file for complete search history.

(56) References Cited

U.S. PATENT DOCUMENTS

| | | | | |
|---|---|---|---|---|
| 3,718,357 A * | 2/1973 | Hertzell | ............... | B60R 13/04 D12/167 |
| 4,869,538 A * | 9/1989 | Presley | ............... | B60R 21/00 293/127 |
| 6,893,079 B1 | 5/2005 | Johnson et al. | | |
| 7,588,267 B2 * | 9/2009 | Trozzi | ............... | B60R 21/0134 180/281 |
| 2001/0028161 A1 * | 10/2001 | Hoagland | ........... | B62D 1/197 280/730.2 |
| 2006/0197319 A1 * | 9/2006 | Nakamura | ........... | B60R 19/205 180/274 |
| 2008/0061566 A1 * | 3/2008 | Ryan | ............... | B60R 19/38 293/118 |
| 2008/0119993 A1 * | 5/2008 | Breed | ............... | G01S 7/023 701/45 |

(Continued)

FOREIGN PATENT DOCUMENTS

| | | |
|---|---|---|
| DE | 102010050826 A1 | 5/2012 |
| GB | 2482195 A | 1/2012 |
| JP | 2019167061 A | 10/2019 |

*Primary Examiner* — Frank B Vanaman
(74) *Attorney, Agent, or Firm* — Frank A. MacKenzie; Bejin Bieneman PLC

(57) ABSTRACT

An assembly includes a rocker elongated along a vehicle longitudinal axis. A first slider is supported by the rocker. A second slider is supported by the rocker and is spaced from the first slider along the longitudinal axis. A first actuator is configured to slide the first slider relative to the rocker along a lateral axis. A second actuator is configured to slide the second slider relative to the rocker along the lateral axis. A cable extends from the first slider to the second slider.

20 Claims, 8 Drawing Sheets

(56) References Cited

U.S. PATENT DOCUMENTS

| | | | |
|---|---|---|---|
| 2012/0223513 A1* | 9/2012 | King, IV | B60J 11/06 |
| | | | 280/770 |
| 2013/0147174 A1* | 6/2013 | Kim | B60R 19/205 |
| | | | 280/770 |
| 2016/0167544 A1* | 6/2016 | Barbat | H01M 50/242 |
| | | | 180/68.5 |
| 2016/0355152 A1* | 12/2016 | Perez Garcia | B60R 21/2338 |
| 2019/0312246 A1* | 10/2019 | Sawatzki | B62D 21/157 |
| 2022/0363143 A1* | 11/2022 | Faruque | B60K 1/04 |

* cited by examiner

ELECTRIC-VEHICLE BATTERY RESTRAINT

BACKGROUND

An electric vehicle includes a battery that powers the vehicle, including propulsion of the vehicle. For example, wheels of the vehicle are powered by one or more electric motors that are powered by the battery. The battery is relatively large and heavy and, accordingly, the battery is typically packaged below the passenger compartment of the vehicle. The battery may be subject to varying degree of damage during certain vehicle impacts if crash loads are applied to the battery.

DETAILED DESCRIPTION

Figure 1:
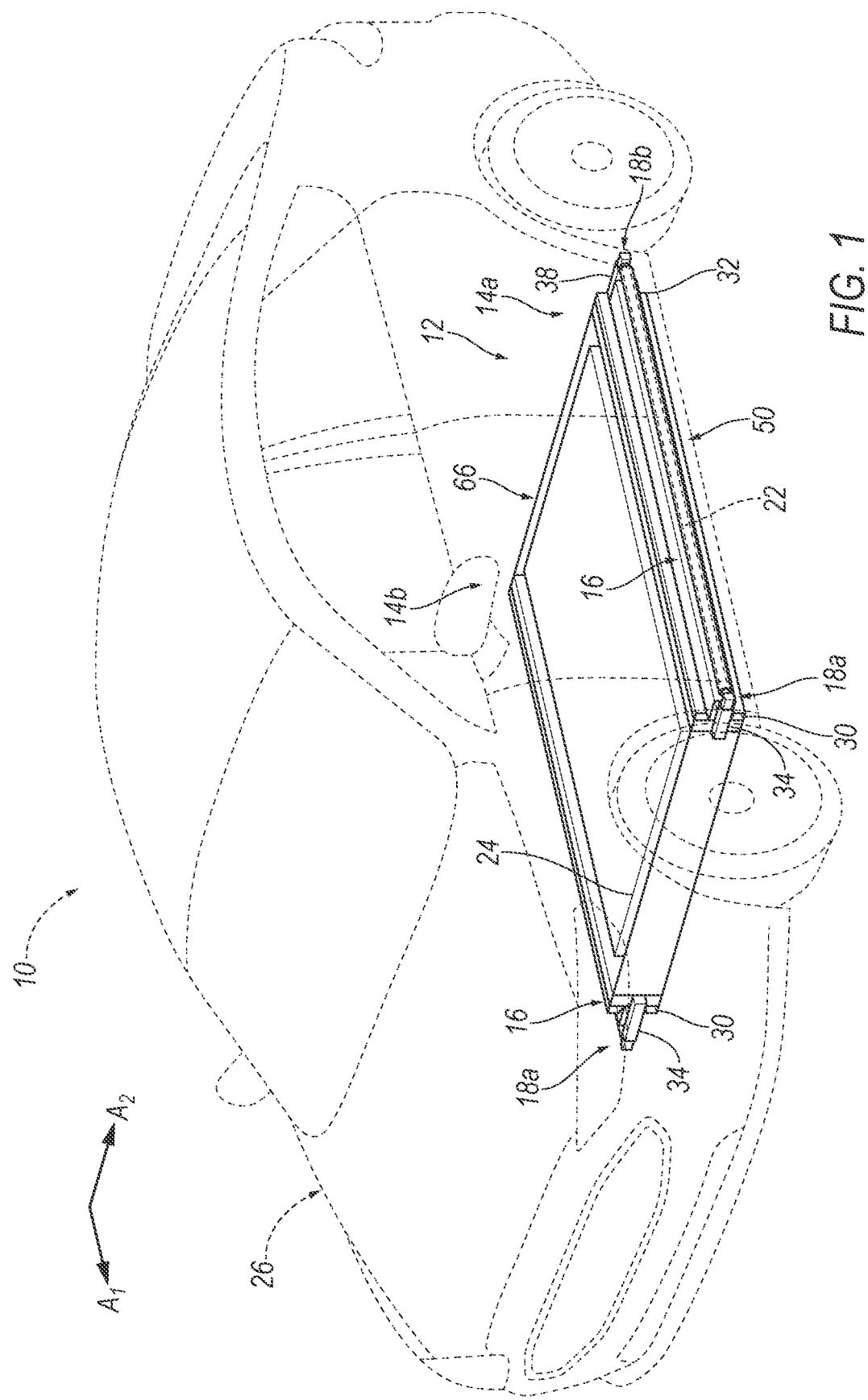
FIG. 1 is a perspective view of an electric vehicle including an example restraint system.

An assembly includes a rocker elongated along a longitudinal axis. A first slider is supported by the rocker. A second slider is supported by the rocker and is spaced from the first slider along the longitudinal axis. A first actuator is configured to slide the first slider relative to the rocker along a lateral axis. A second actuator is configured to slide the second slider relative to the rocker along the lateral axis. A cable extends from the first slider to the second slider.

The cable may be fixed to the first and second sliders. The cable may be under tension between the first and second sliders.

The assembly may include an airbag supported by the cable and being inflatable to an inflated position.

The cable and the airbag may be disposed outboard of the rocker relative to the lateral axis.

The airbag may extend annularly around the cable. The airbag may extend from the first slider to the second slider.

The assembly may include a cover supported by the cable and including a tear seam. The cover may enclose the airbag in an uninflated position, and the airbag may extend through the tear seam in the inflated position.

The assembly may include a first inflator in fluid communication with the airbag and a second inflator in fluid communication with the airbag. The first and second inflators may be supported by the rocker and may be spaced from each other along the longitudinal axis.

The assembly may include an electric-vehicle battery supported by the rocker. The rocker may be disposed between the cable and the electric-vehicle battery.

The first and second sliders may be slidable in a direction away from the electric-vehicle battery.

The cable may be disposed outboard of the rocker relative to the lateral axis.

The first and second sliders may be slidable in a vehicle-outboard direction relative to the lateral axis to a deployed position.

The cable may be spaced farther from the rocker when the first and second sliders are in the deployed position than when the first and second sliders are in an undeployed position.

The assembly may include a computer including a processor and a memory storing instructions executable by the processor to control actuation of the first and second actuators in response to a vehicle impact.

The assembly may include an airbag supported by the cable. The instructions may further include instructions to control inflation of the airbag in response to the vehicle impact. The instructions may further include instructions to initiate actuation of the first and second actuators prior to initiating inflation of the airbag.

The rocker may be disposed between the first slider and the second slider.

The rocker may include a front end and a rear end spaced from the front end along the longitudinal axis. The first slider may be disposed at the front end, and the second slider may be disposed at the rear end.

The assembly may include a first housing supported by the rocker and a second housing supported by the rocker. The first slider may be slidably engaged with the first housing, and the second slider may be slideably engaged with the second housing.

The first slider may include a first end disposed external to the first housing, and the second slider may include a first end disposed external to the second housing.

The rocker may include a front end and a rear end spaced from the front end along the vehicle longitudinal axis. The first housing may be disposed at the front end, and the second housing may be disposed at the rear end.

With reference to the Figures, wherein like numerals indicate like parts throughout the several views, an electric vehicle 10 is generally shown. The electric vehicle 10 includes a restraint system 12 having an assembly 14. The assembly 14 includes a rocker 16 elongated along a longitudinal axis R1. A first slider 18a is supported by the rocker 16. A second slider 18b is supported by the rocker 16 and is spaced from the first slider 18a along the longitudinal axis R1. A first actuator 20a is configured to slide the first slider 18a relative to the rocker 16 along a lateral axis R2. A second actuator 20b is configured to slide the second slider 18b relative to the rocker 16 along the lateral axis R2. A cable 22 extends from the first slider 18a to the second slider 18b.

During a vehicle side-impact of the electric vehicle 10, force on the electric vehicle 10 may force vehicle components towards an electric-vehicle battery 24. For example, during the vehicle side-impact, an object exerts a force on the electric vehicle 10, which can force vehicle components towards the electric-vehicle battery 24. During the side-impact, the first and second actuators 20a, 20b slide the first and second sliders 18a, 18b outboard, which moves the cable 22 away from the rocker 16 and the electric-vehicle battery 24. As the object impacts the cable 22, the object exerts a force on the cable 22, and the cable 22 distributes the force to the sliders 18. This reduces the likelihood of vehicle components impacting the electric-vehicle battery 24 during the vehicle side-impact. Specifically, the cable 22 remains connected to the sliders 18 such that the cable 22 remains under tension during the vehicle side-impact. Thus, during a vehicle side-impact, the cable 22 directs the force from the object away from the electric-vehicle battery 24 and towards the sliders 18.

With reference to FIG. 1, the electric vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The electric vehicle 10 generates propulsion from electric power. Examples of electric vehicles include a battery-electric vehicle (BEV), a hybrid-electric vehicle (HEV), a plug-in hybrid electric vehicles (PHEV), etc. The electric vehicle 10, for example, may be an autonomous vehicle. In other words, the electric vehicle 10 may be autonomously operated such that the electric vehicle 10 may be driven without constant attention from a driver, i.e., the electric vehicle 10 may be self-driving without human input.

The electric vehicle 10 defines a vehicle-longitudinal axis A1, e.g., extending between a front and a rear of the electric vehicle 10. The electric vehicle 10 defines a vehicle-lateral axis A2, e.g., extending between a left side and a right side of the electric vehicle 10. The vehicle-longitudinal axis A1 and the vehicle-lateral axis A2 are perpendicular to each other.

With reference to FIG. 1, the electric vehicle 10 includes a body 26 and a frame (not numbered). The body 26 and frame may be of a unibody construction. In the unibody construction, the body 26 serves as the frame, and the body 26 is unitary, i.e., a continuous one-piece unit. As another example, the body 26 and frame may have a body-on-frame construction (also referred to as a cab-on-frame construction). In other words, the body 26 and frame are separate components, i.e., are modular, and the body 26 is supported on and affixed to the frame. Alternatively, the body 26 and frame may have any suitable construction. The body 26 and/or the frame may be formed of any suitable material, for example, steel, aluminum, etc.

With continued reference to FIG. 1, the electric-vehicle battery 24 powers propulsion of the electric vehicle 10, e.g., powers a drivetrain motor. The electric-vehicle battery 24 may be of any suitable type for vehicular electrification, for example, lithium-ion batteries, nickel-metal hydride batteries, lead-acid batteries, ultracapacitors, etc. The electric-vehicle battery 24 may include at least one battery module. Each battery module may include one or more battery cells. A battery tray 66 may include a compartment that receives the battery modules. The electric-vehicle battery 24 may include any suitable hardware, e.g., wiring, connectors, circuits, etc., connecting the battery modules to each other and to electrified components of the electric vehicle 10.

The battery tray 66 supports the electric-vehicle battery 24 on the body 26. For example, the electric-vehicle battery 24 may be disposed in and supported by the battery tray 66. The battery tray 66 may be disposed between the rockers 16 along the vehicle-lateral axis A2. The battery tray 66 may be fixed to the body 26, e.g., to the rockers 16, the floor, etc. The battery tray 66 may be fixed directly, or indirectly via one or more intermediate components, to the body 26, e.g., via fasteners, welding, etc.

The battery tray 66 may include panels, e.g., a bottom panel (not numbered), a top panel (not shown), and side panels (not numbered), that enclose the electric-vehicle battery 24. The panels may prevent intrusion of precipitation and dirt to the electric-vehicle battery 24. The top panel may separate the electric-vehicle battery 24 from components of the electric vehicle 10 above the battery tray 66, e.g., the passenger cabin.

With continued reference to FIG. 1, the restraint system 12 may include more than one assembly 14. For example, the restraint system 12 may include one assembly 14a, 14b for each side of the electric vehicle 10. In such an example, the assemblies 14a, 14b may be mirror images of each other about the vehicle-longitudinal axis A1. The assemblies 14a, 14b may include common features, e.g., a rocker 16, sliders 18, actuators 20, a cable 22, etc. Common features among the assemblies 14a, 14b shown in the Figures are identified with common numerals.

Figure 2A:
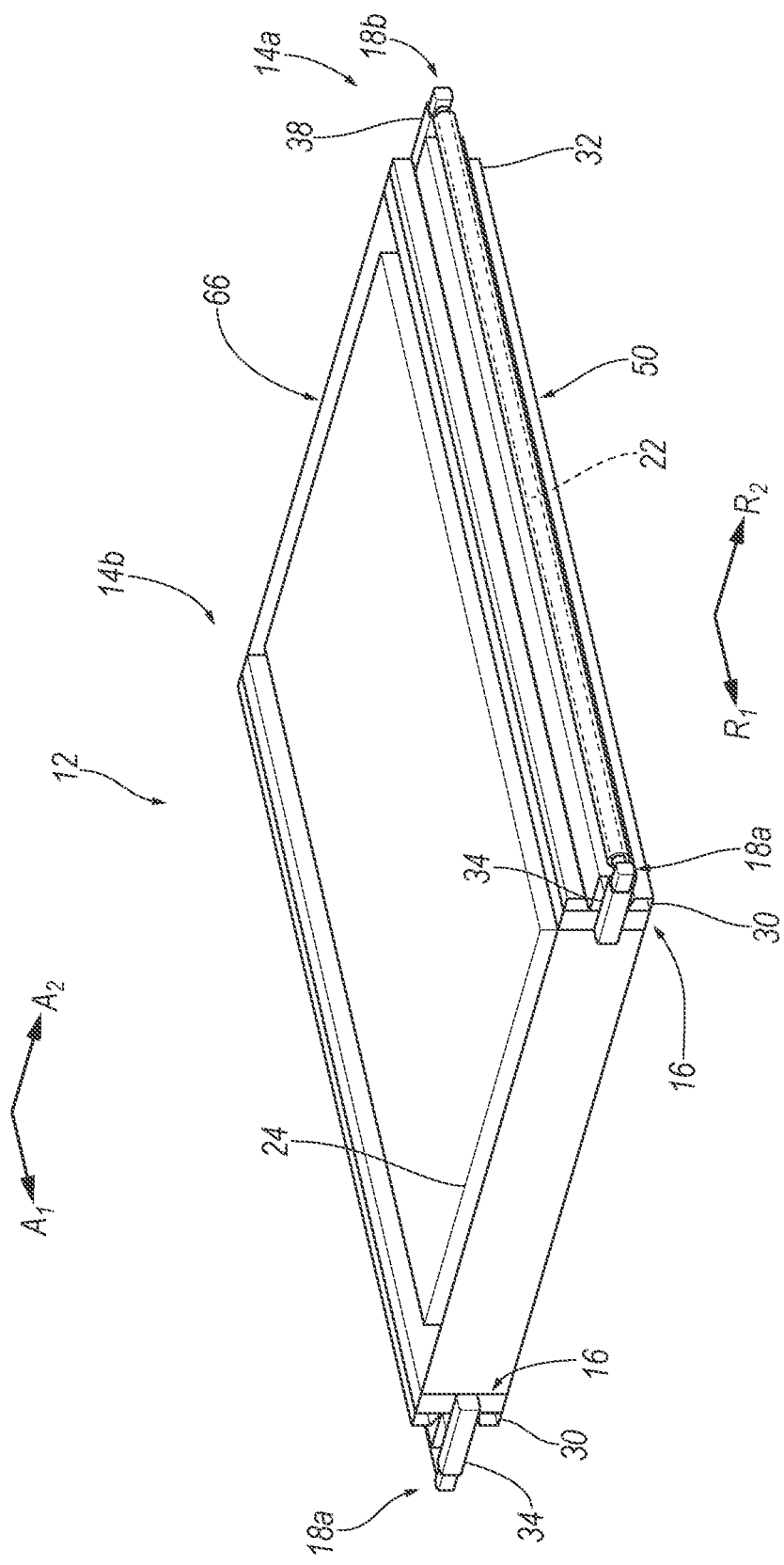
FIG. 2A is a perspective view of the example restraint system including first and second sliders in an undeployed position and an airbag in an uninflated position.
Figure 2B:
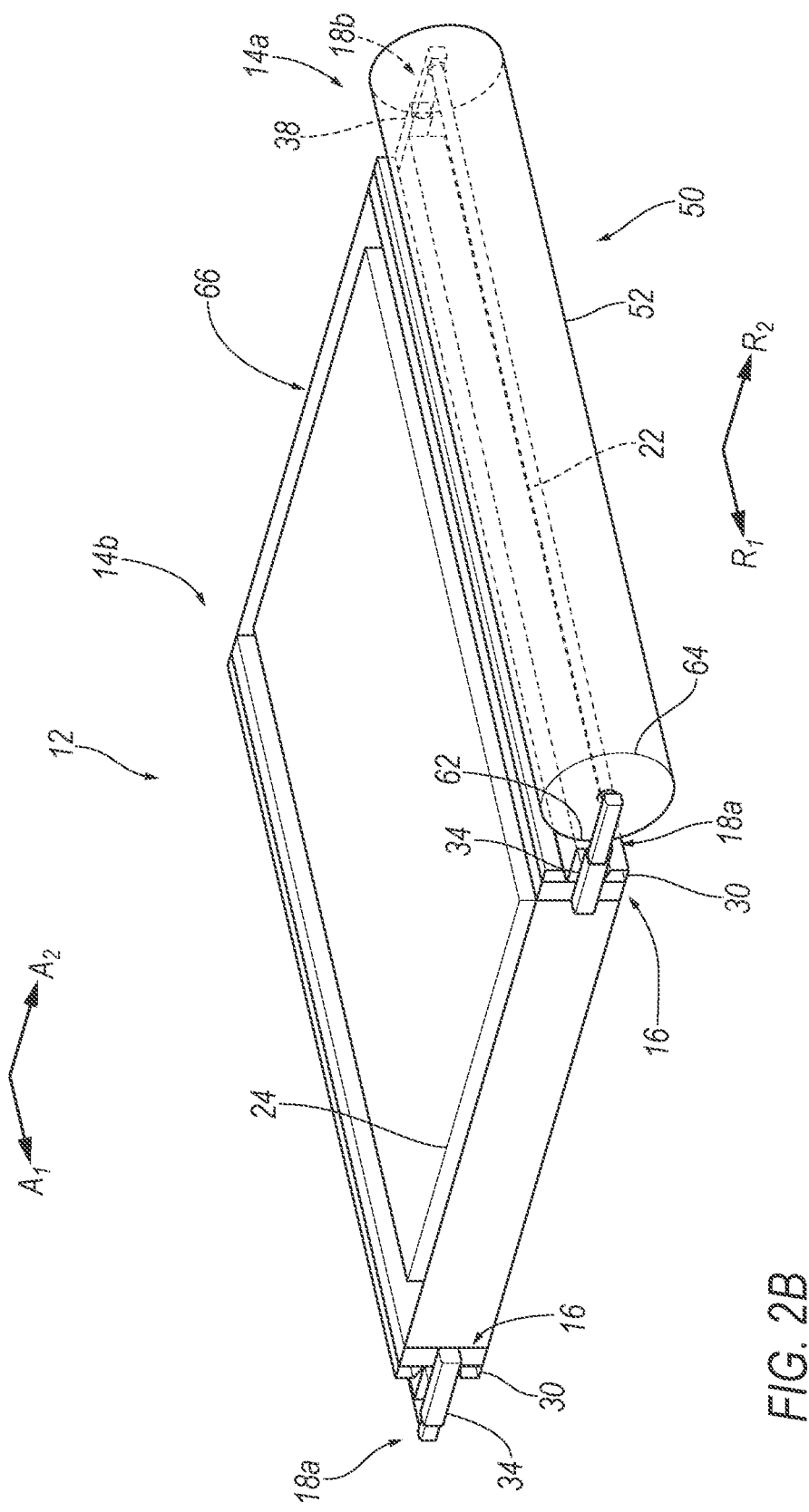
FIG. 2B is a perspective view of the example restraint system including the first and second sliders in a deployed position and the airbag in an inflated position.

With reference to FIGS. 1-2B, the rocker 16 is disposed on one side of the electric vehicle 10. Another rocker 16 is disposed on the other side of the electric vehicle 10. The rockers 16 may be components of the body 26 and/or the frame. The rockers 16 are the lowest portion of a side of the electric vehicle 10. The rockers 16 provide rigidity at the respective side of the electric vehicle 10. The rockers 16 support vehicle components, such as a floor, doors, pillars, etc. The rockers 16 may be substantially identical to each other. For example, the rockers 16 may be mirror images of each other about the vehicle-longitudinal axis A1. The rockers 16 may include common features, e.g., a front end 30, a back end 32, etc.

The rocker 16 includes a front end 30 and a back end 32 spaced from the front end 30. The rocker 16 defines the longitudinal axis R1, e.g., extending between the front end 30 and the back end 32 of the rocker 16. The rocker 16 is elongated from the front end 30 to the back end 32. In other words, the longest dimension of the rocker 16 is along the longitudinal axis R1. The rocker 16 defines a lateral axis R2, e.g., extending between an inboard side and an outboard side of the rocker 16 (with "inboard" and "outboard" referring to the relative position of the sides in a cross-vehicle direction). The longitudinal axis R1 and the lateral axis R2 are perpendicular to each other.

Figure 5A:
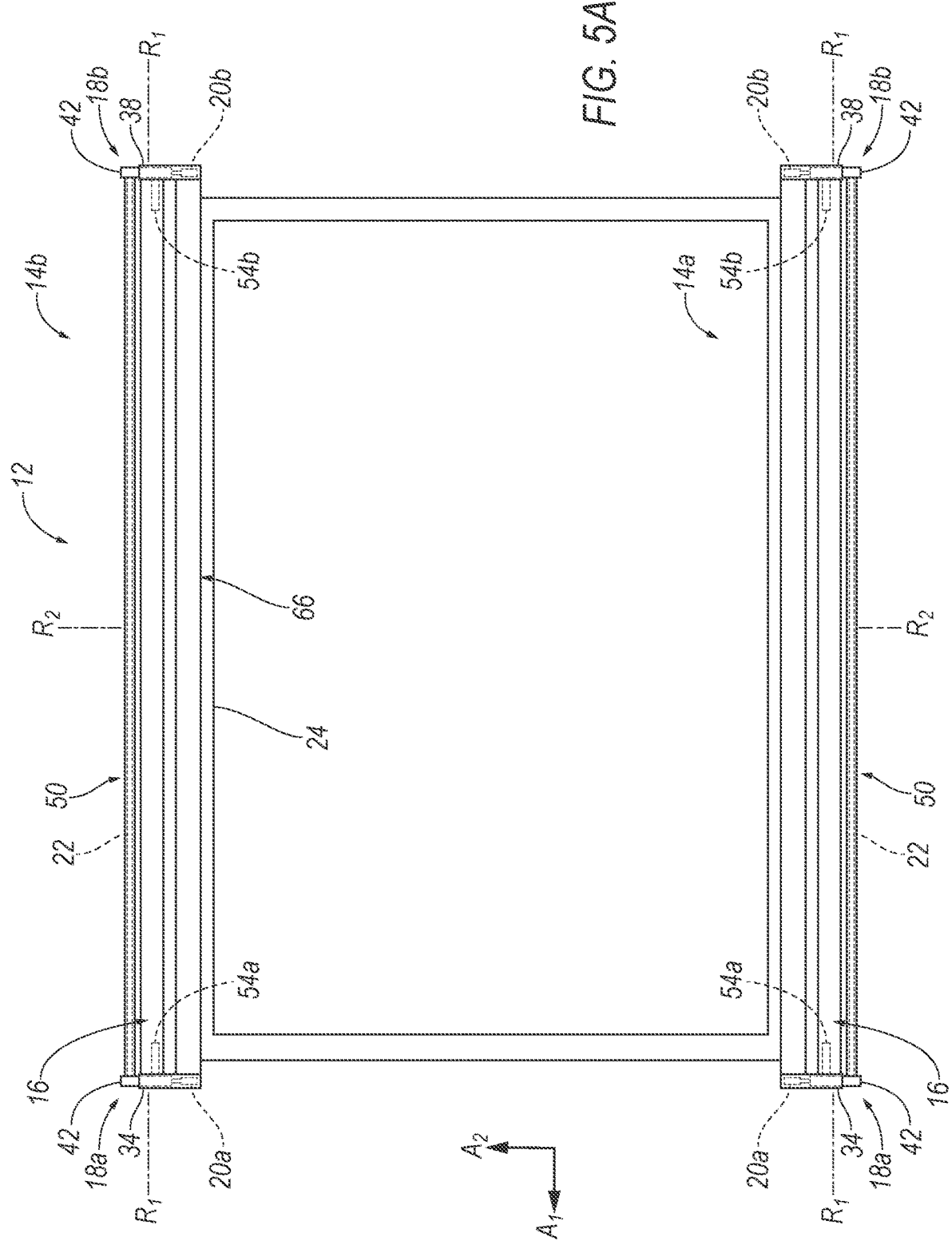
FIG. 5A is a top view of the example restraint system of FIG. 2A.
Figure 5B:
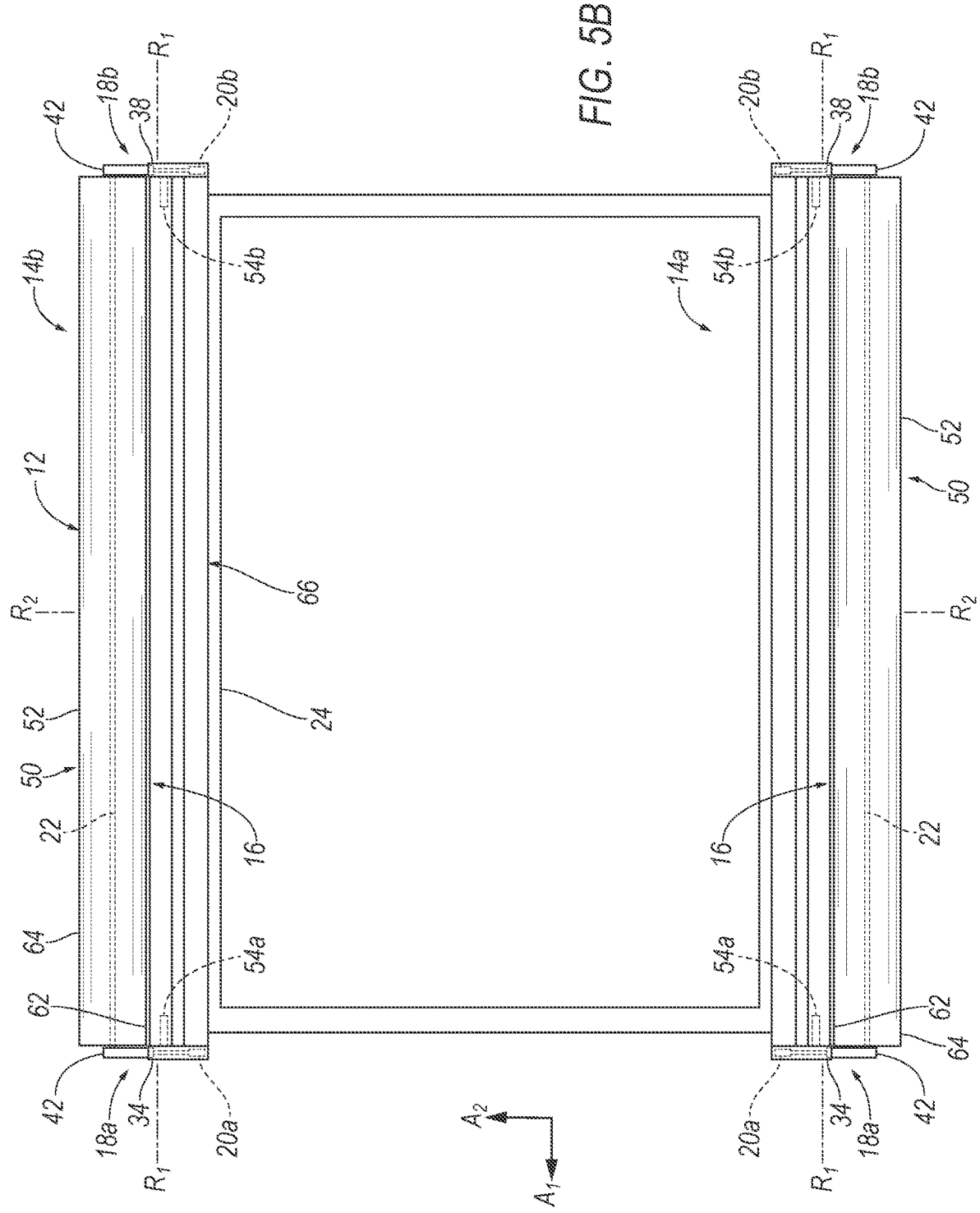
FIG. 5B is a top view of the example restraint system of FIG. 2B.

The longitudinal axis R1 is generally parallel to the vehicle-longitudinal axis A1, and the lateral axis R2 is generally parallel to the vehicle-lateral axis A2, as shown in FIGS. 5A-5B. In this context, "generally parallel" means that the axis R1, R2 extends generally along the respective vehicle axis A1, A2, even if the axis slightly deviates from parallel due to, for example, packaging constraints, manufacturing tolerance limitations, assembly tolerance limitations, etc. The longitudinal axis R1 may be offset relative to the vehicle-longitudinal axis A1, and the lateral axis R2 may be offset relative to the vehicle-lateral axis A2.

Figure 3A:
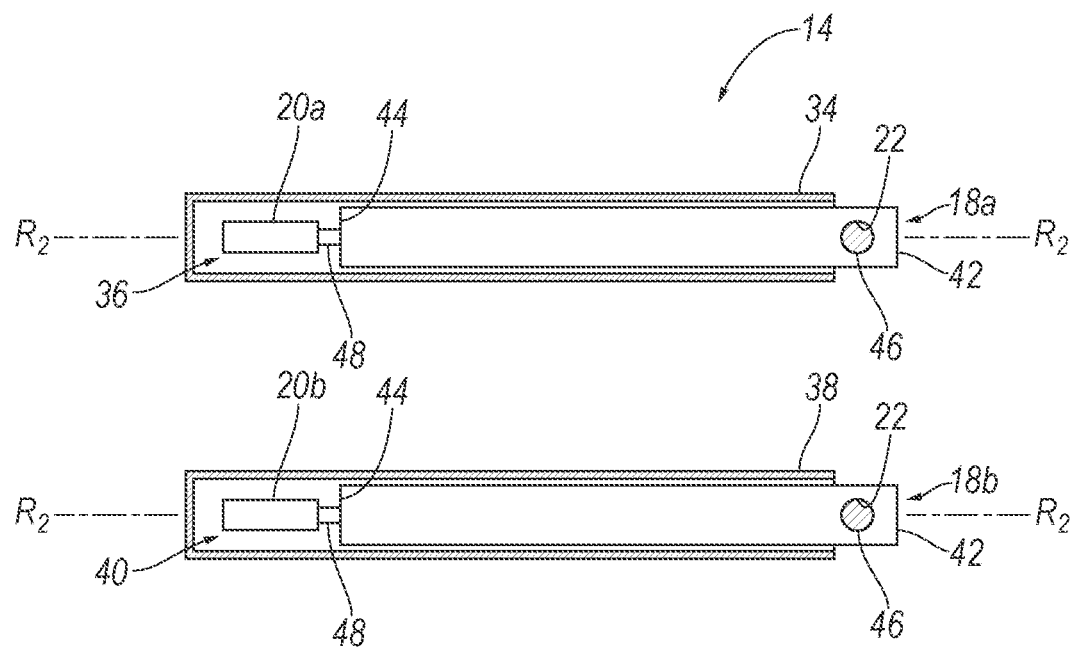
FIG. 3A is a cross-sectional view of an example first and second housings including example actuators engaged with example sliders in the undeployed position.
Figure 3B:
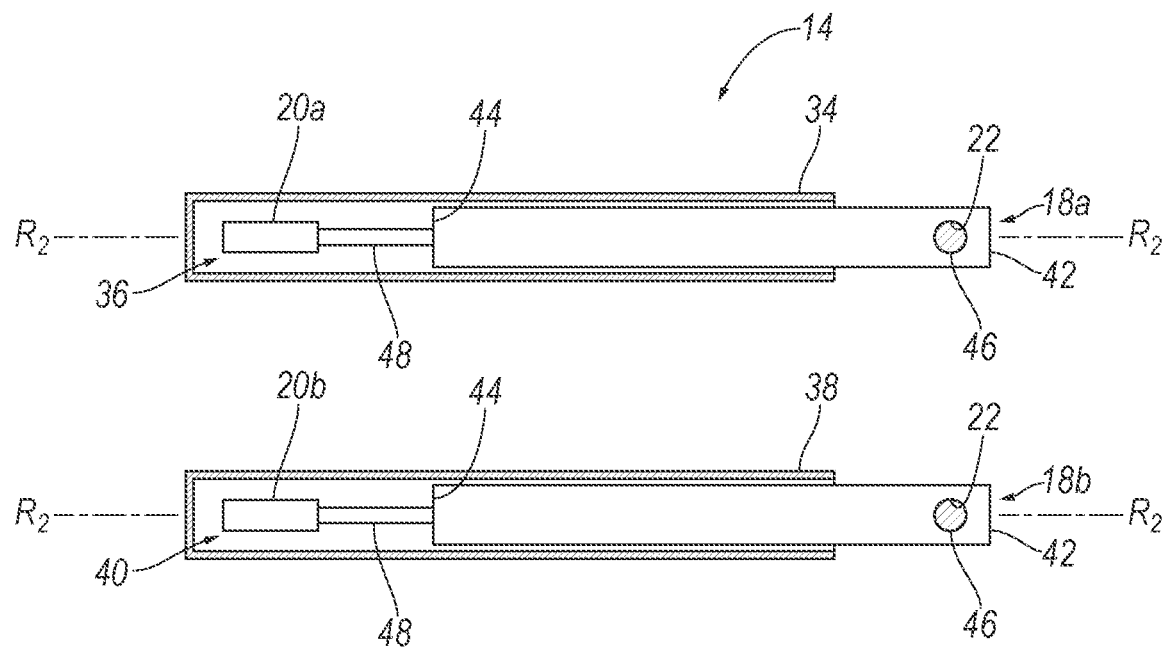
FIG. 3B is a cross-sectional view of the example first and second housings including the example actuators engaged with example the sliders in the deployed position.

With reference to FIGS. 3A-3B, the assembly 14 may include a first housing 34 defining a first cavity 36 elongated along the lateral axis R2. The first housing 34 may house the first slider 18a. For example, the first slider 18a may be received in the first cavity 36. The first slider 18a is slidable relative to the rocker 16 from an undeployed position to a deployed position (as discussed further below). That is, the first slider 18a may be sized to be slidable within the first cavity 36 of the first housing 34. The first housing 34 may include a stop (not shown) in the first cavity 36 that engages a lip (not shown) on the first slider 18a to stop relative sliding of the first slider 18a in the vehicle-outboard direction, i.e., a direction along the vehicle-lateral axis A2 and away from the vehicle-longitudinal axis A1.

Additionally, the first housing 34 and the first slider 18a may include locking elements (not shown) engageable with each other to prevent relative sliding of the first slider 18a in the vehicle-inboard direction, i.e., a direction along the vehicle-lateral axis A2 and towards the vehicle-longitudinal axis A1. When the first slider 18a is in the undeployed position, the locking elements are disengaged from each other. In this situation, the first slider 18a can move relative to the first housing 34. When the first slider 18a is in the deployed position, the respective locking elements are engaged with each other. In this situation, the first slider 18a is locked with the first housing 34, i.e., fixed relative to the rocker 16. That is, the first slider 18a is maintained in the deployed position when the respective locking elements are engaged with each other.

The locking elements may, for example, include a finger and an opening. As one example, the first slider 18a can include the finger extending from a side of the first slider 18a to a side of the first housing 34. The finger can be biased, e.g., by a spring, away from the side of the first slider 18a. That is, the fingers may abut the side of the first housing 34 when the first slider 18a is in the undeployed position and while the first slider 18a moves to the deployed position. Additionally, the first housing 34 can include the opening disposed on a side of the first housing 34. The opening is designed to receive the finger of the first slider 18a when the first slider 18a is in the deployed position. That is, when the first slider 18a is in the deployed position, the finger is biased into the opening of the first housing 34. When the finger is in the opening, the opening retains the finger, which prevents the first slider 18a from moving to the undeployed position. The opening has any suitable shape, e.g., elliptical, circular, etc. The first slider 18a may include any suitable number of fingers, and the first housing 34 may include a corresponding number of openings.

The first housing 34 may be disposed at any suitable position relative to the front end 30 of the rocker 16. For example, the first housing 34 may be disposed at the front end 30 of the rocker 16, as shown in FIGS. 1, 2A, 2B, 5A, and 5B. As another example, the first housing 34 spaced from the front end 30 in a vehicle-rearward direction. As yet another example, the first housing 34 may be spaced from the front end 30 in a vehicle-forward direction.

Figure 4A:
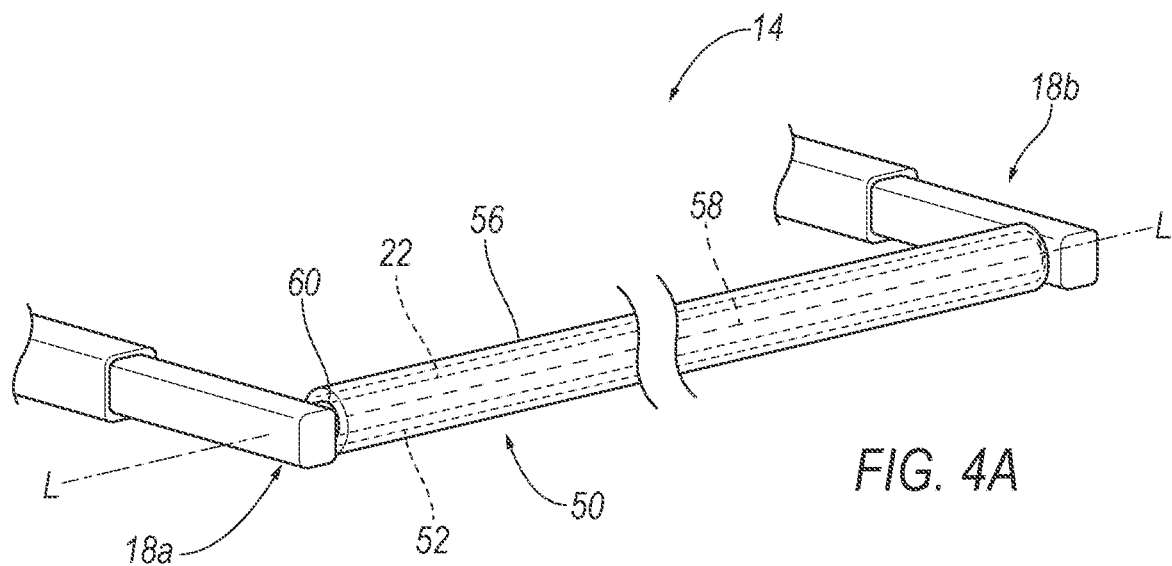
FIG. 4A is a perspective view of an example airbag assembly including the airbag in the uninflated position.
Figure 4B:
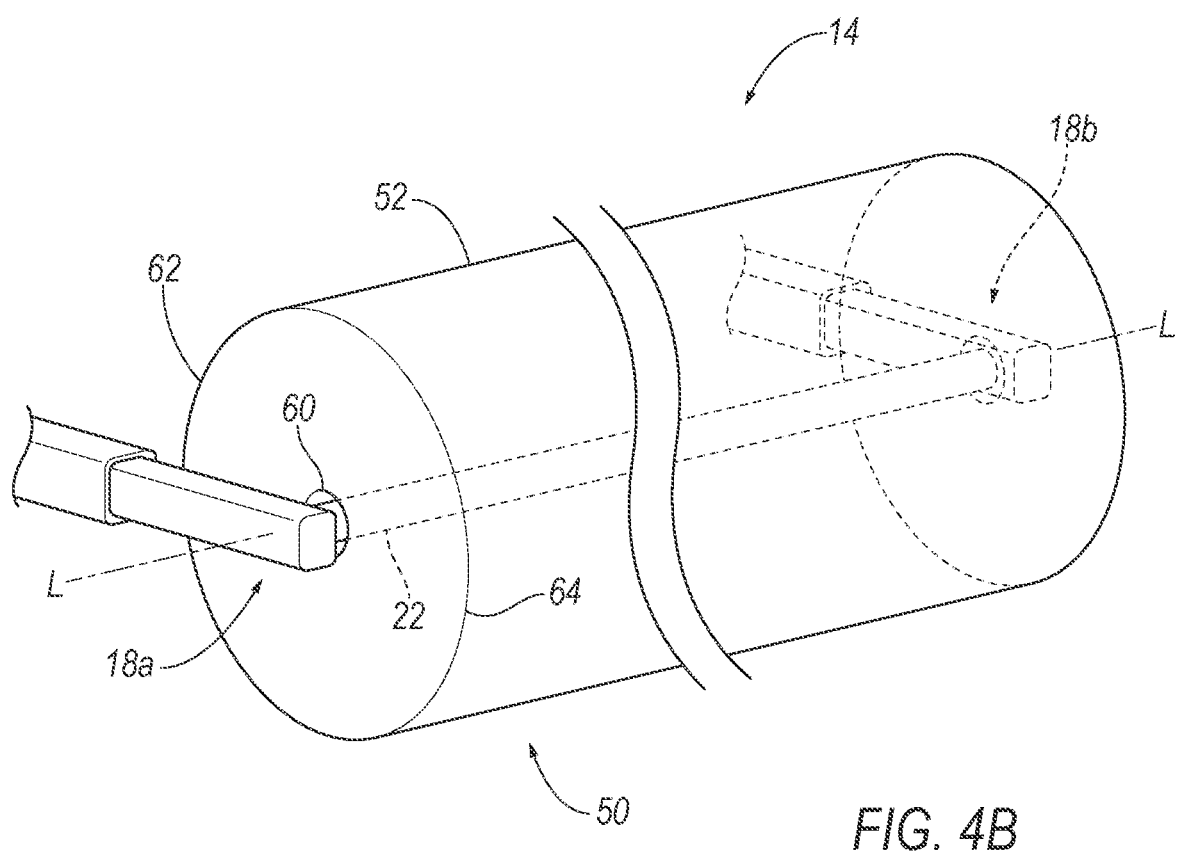
FIG. 4B is a perspective view of the example airbag assembly including the airbag in the inflated position.

With continued reference to FIGS. 4A-4B, the assembly 14 may include a second housing 38 defining a second cavity 40 elongated along the lateral axis R2. The second housing 38 may house the second slider 18b. For example, the second slider 18b may be received in the second cavity 40. The second slider 18b is slidable relative to the rocker 16 from an undeployed position to a deployed position (as discussed further below).

The second housing 38 may be substantially identical to the first housing 34. The second housing 38 may be spaced from the first housing 34 along the longitudinal axis R1. For example, the second housing 38 may be disposed vehicle-rearward, i.e., towards the rear of the electric vehicle 10, of the first housing 34, as shown in FIGS. 1, 2A, 2B, 5A, and 5B. The second housing 38 may be disposed at any suitable position relative to the back end 32 of the rocker 16. For example, the first and second housings 34, 38 may be mirror images of each other about the lateral axis R2. The second housing 38 and the first housing 34 may include common features, e.g., locking elements, stops, etc.

The first and second housings 34, 38 may be mounted to any suitable vehicle component, e.g., the rocker 16, the floor, etc. The first and second housings 34, 38 may be mounted to a same or different vehicle component. The first and second housings 34, 38 may, for example, include locating elements, fastener, etc., that engage the vehicle component. Additionally, or alternatively, fasteners may engage the respective housing 34, 38 and the respective vehicle component to mount the respective housing 34, 38 to the respective vehicle component.

The first and second sliders 18a, 18b are slidable from an undeployed position, as shown in FIGS. 2A, 3A, and 4A, to a deployed position, as shown in FIGS. 2B, 3B, and 4B, by the first and second actuators 20a, 20b, respectively (as described below). For example, the first slider 18a may slide relative to the first housing 34 from the undeployed position to the deployed position, and the second slider 18b may slide relative to the second housing 38 from the undeployed position to the deployed position. The first and second sliders 18a, 18b are slidable along the lateral axis R2 away from the electric-vehicle battery 24. That is, the first and second sliders 18a, 18b are slidable in the vehicle-outboard direction.

With continued reference to FIGS. 3A-3B, the first slider 18a may include a first end 42 and a second end 44 spaced from the first end 42 along the lateral axis R2. The first slider 18a may be elongated from the first end 42 to the second end 44. The second end 44 of the first slider 18a may be disposed in the first housing 34. The second end 44 of the first slider 18a is engaged with the first actuator 20a.

In the undeployed position, the first end 42 of the first slider 18a may be disposed at any suitable position relative to the rocker 16. For example, the first end 42 of the first slider 18a may be disposed vehicle-outboard of the rocker 16 in the undeployed position, as shown in FIGS. 1, 2A, 3A, 4A, and 5A. As another example, the first end 42 of the first slider 18a may be disposed vehicle-inboard of the rocker 16 in the undeployed position. As yet another example, the first end 42 of the first slider 18a may be disposed between sides of the rocker 16 along the lateral axis R2 in the undeployed position.

Additionally, in the undeployed position, the first end 42 of the first slider 18a may be disposed at any suitable position relative to the first housing 34. For example, the first end 42 of the first slider 18a may be disposed vehicle-outboard of the first housing 34, i.e., external to the first cavity 36, as shown in FIGS. 1, 2A, 3A, 4A, and 5A. As another example, the first end 42 of the first slider 18a may be disposed in the first housing 34, i.e., the first cavity 36. In such an example, the first housing 34 may include a slot on a vehicle-rearward side of the first housing 34. The slot may be elongated along the lateral axis R2 and designed, i.e., sized and shaped, to receive the cable 22.

In the deployed position, the first end 42 of the first slider 18a is disposed vehicle-outboard of the first housing 34, and specifically, the rocker 16, as shown in FIGS. 2B, 3B, 4B, and 5B. The deployed position is vehicle-outboard of the undeployed position. The first end 42 of the first slider 18a in the deployed position may be spaced from the rocker 16 by any suitable amount along the lateral axis R2. The first end 42 of the first slider 18a may, for example, be disposed farther from the rocker 16 along the lateral axis R2 when the first slider 18a is in the deployed position than when the first slider 18a is in the undeployed position.

With continued reference to FIGS. 3A-3B, the first slider 18a may include a hole 46 disposed adjacent to the first end 42 and extending through the first slider 18a. The hole 46 may be designed, i.e., sized and shaped, to receive the cable 22. The hole 46 may include a feature for threadedly engaging the cable 22. For example, the hole 46 may include threads. As another example, a weld nut may be disposed in the hole 46.

The second slider 18b may be substantially identical to the first slider 18a. For example, the first and second sliders 18a, 18b may be mirror images of each other about the lateral axis R2. For example, the second slider 18b in the undeployed position may mirror the first slider 18a in the undeployed position, and the second slider 18b in the deployed position may mirror the first slider 18a in the deployed position. The second slider 18b and the first slider 18a may include common features, e.g., a first end 42, a second end 44, a hole 46, etc. Common features among the first and second sliders 18a, 18b shown in the Figures are identified with common numerals. The hole 46 of the second slider 18b is generally aligned with the hole 46 of the first slider 18a relative to the lateral axis R2. In this context, "generally aligned" means that an axis extending from the hole 46 of the first slider 18a to the hole 46 of the second slider 18b extends along the longitudinal axis R1 and may be parallel or generally parallel to the longitudinal axis R1. For example, the hole 46 of the first slider 18a and the hole 46 of the second slider 18b may be spaced a common distance from the rocker 16.

The first and second sliders 18a, 18b are designed, i.e., sized and shaped, to maintain a tensile force in the cable 22 that can oppose movement of vehicle components towards the electric-vehicle battery 24, as discussed below. The first and second sliders 18a, 18b may have any suitable size, e.g., perimeter, area, etc. The first and second sliders 18a, 18b may have any suitable shape, e.g., rectangle, square, etc. The first and second sliders 18a, 18b may be any suitable material, e.g., metal, plastic, etc.

The first actuator 20a may be supported by the first housing 34, as shown in FIGS. 3A, 3B, 5A, and 5B. For example, the first actuator 20a may be mounted to the first housing 34 in the first cavity 36. For example, the first actuator 20a may include locating elements, fastener, etc., that engage the first housing 34. Additionally, or alternatively, fasteners may engage the first actuator 20a and the first housing 34 to mount the first actuator 20a to the first housing 34. As another example, the first actuator 20a may be mounted to any other suitable vehicle component, e.g., the floor, the rocker 16, etc.

The first actuator 20a is connected to the first slider 18a, e.g., the second end 44. As an example, a rigid bar 48 may extend from the first actuator 20 to the first slider 18a, as shown in FIGS. 3A-3B. The rigid bar 48 may be connected to the first slider 18a, e.g., via fasteners, welding, etc.

The first actuator 20a is configured to push the first slider 18a to the deployed position. That is, the first actuator 20a is operable to push the second end 44 of the first slider 18a along the lateral axis R2 away from the electric-vehicle battery 24, i.e., in the vehicle-outboard direction. Specifically, the first actuator 20a is positioned such that the first actuator 20a is elongated along the lateral axis R2, as shown in FIGS. 3A, 3B, 5A, and 5B. The first actuator 20a is actuated in response to a vehicle impact (or pre-impact), as discussed below. Since the first actuator 20a is connected to the first slider 18a, e.g., by the rigid bar 48, the first actuator 20a pushes the first slider 18a along the lateral axis R2. The first actuator 20a may linearly extend the rigid bar 48. When the first actuator 20a extends the rigid bar 48, the rigid bar 48 transmits a force to push the first slider 18a along the lateral axis R2. Additionally, the first actuator 20a may be configured to prevent the first slider 18a from moving to the undeployed position from the deployed position, i.e., in the vehicle-inboard direction.

The first actuator 20a may, for example, be any actuator that ignites a combustible material. For example, the first actuator 20a may include a pyrotechnic charge that produces gas or otherwise rapidly expands upon actuation. That is, the first actuator 20a may be pyrotechnically actuated. Specifically, the first actuator 20a may include a cylinder and a piston and pyrotechnic charge in the cylinder. The piston is connected to the rigid bar 48 and the pyrotechnic charge is ignited to slide the piston along the cylinder, i.e., moving the piston and the rigid bar 48 relative to the first housing 34. In response to a vehicle impact, as discussed further below, the first actuator 20a actuates to move the piston, which pushes the first slider 18a in the vehicle-outboard direction to the deployed position. The first actuator 20a may, for example, be actuated simultaneously to the inflation of an airbag 52, as discussed below. As another example, the first actuator 20a may be actuated prior to the inflation of the airbag 52a.

The second actuator 20b may be supported by the second housing 38, e.g., in substantially the same manner as discussed above regarding the first actuator 20a, as shown in FIGS. 3A, 3B, 5A, and 5B. As another example, the second actuator 20b may be mounted to any other suitable vehicle component, e.g., the floor, the rocker 16, etc. The second actuator 20b is connected to the second slider 18b, e.g., in substantially the same manner as discussed above regarding the first actuator 20a.

The second actuator 20b may be substantially identical to the first actuator 20a. For example, the second actuator 20b and the first actuator 20a may be mirror images of each other about the lateral axis R2. The second actuator 20b may be configured to push the second slider 18b to the deployed position, e.g., in substantially the same manner as discussed above with regards to the first actuator 20a. The second actuator 20b is actuated simultaneously to the first actuator 20a, e.g., in response to the vehicle impact. Actuating the first and second actuators 20a, 20b simultaneously maintains the general alignment of the holes 46 of the first and second sliders 18a, 18b during movement to the deployed position.

As set forth above, the cable 22 extends from the first slider 18a to the second slider 18b, as shown in FIGS. 1-2B, 5A, and 5B. Specifically, the cable 22 extends through the holes 46 of the first and second sliders 18a, 18b. That is, the cable 22 extends along the rocker 16. The cable 22 is elongated along the longitudinal axis R1. For example, the cable 22 may extend from the front end 30 of the rocker 16 to the back end 32 of the rocker 16.

The cable 22 may be disposed at any suitable position relative to the rocker 16 along the lateral axis R2 when the sliders 18 are in the undeployed position. For example, the cable 22 may be vehicle-outboard of the rocker 16. As another example, the cable 22 may be vehicle-inboard of the rocker 16. As another example, the cable 22 may be disposed between the sides of the rocker 16. The cable 22 is vehicle-outboard of the rocker 16 relative to the lateral axis R2 when the sliders 18 are in the deployed position.

The cable 22 includes two ends (not numbered) spaced from each other and generally aligned with each other relative to the lateral axis R2. One end is fixed relative to the first slider 18a and the other end is fixed relative to the second slider 18b. For example, the ends may be threaded and threadedly engaged with the respective slider, e.g., via the weld nut. As other examples, the ends may be connected directly, or indirectly via one or more intermediate components, to the respective slider via fasteners, welding, etc.

The cable 22 is designed, i.e., sized and shaped, to oppose movement of vehicle components towards the electric-vehicle battery 24 during a vehicle-side impact. The cable 22 may, for example, include several strands of wire that are bonded, twisted, and/or braided together into the shape of a helix. The cable 22 may be designed to have a high tensile strength for transferring heavy loads between the ends 30, 32 of the rocker 16, e.g., via the sliders 18. The cable 22 may have any suitable diameter. The cable 22 may be made of any suitable material such as metal, etc.

The cable 22 is pre-tensioned. Specifically, the cable 22 is under tension between the first slider 18a and the second slider 18b absent force applied by an object, i.e., before an impact that forces the object into the cable 22. In other words, the cable 22 is taught with tensile force between the sliders 18. A vehicle-side impact may force vehicle components vehicle-inboard. Since the cable 22 is under tension before force is applied by the object, the cable 22 distributes the force distributed to the vehicle components during the vehicle impact to the ends 30, 32 of the rocker 16, which can assist in opposing movement of the vehicle components during the vehicle-side impact and reducing the likelihood of vehicle components impacting the electric-vehicle battery 24.

With reference to FIGS. 4A and 4B, the assembly 14 may include an airbag assembly 50, which includes the airbag 52 inflatable from an uninflated position to an inflated position, a first inflator 54a, and a second inflator 54b. The cable 22 may support the airbag assembly 50, and specifically, may support the airbag 52 when the airbag 52 is in the inflated position, as shown in FIG. 4B. The airbag assembly 50 may be mounted to the cable 22, as discussed further below.

The airbag assembly 50 may include a cover 56 supported by the cable 22, as shown in FIG. 4A. The cover 56 may enclose the airbag 52 in the uninflated position. The cover 56 may assist in preventing debris, water, etc., from contacting the airbag 52 during operation of the electric vehicle 10. The cover 56 may be any suitable material, e.g., plastic, rubber, etc.

The cover 56 may include a tear seam 58. The tear seam 58 may be disposed adjacent to the airbag 52. Said differently, the airbag 52 may extend through the tear seam 58 in the inflated position. The tear seam 58 may have any suitable shape. For example, the tear seam 58 may have a linear shape, e.g., extending in a line along the longitudinal axis R1.

The tear seam 58 may be designed to tear apart when subjected to a tensile force above a threshold magnitude. In other words, the cover 56 on one side of the tear seam 58 separates from the cover 56 on the other side of the tear seam 58 when the force is above the threshold magnitude. The threshold magnitude may be chosen to be greater than forces from, e.g., inadvertent pushing against the cover 56 by debris but be less than forces from the deployment of the airbag 52. The tear seam 58 may be, for example, a line of perforations through the cover 56, a line of thinner cover material than the rest of the cover 56, etc.

The airbag 52 may be formed of any suitable airbag material, e.g., from a woven polymer. For example, the airbag 52 may be formed of lightweight high strength orientated-strand fabric material, e.g., from ultra-high molecular weight polyethylene (UHMwPE), such as that commercially available under the tradename Dyneema®, auxetic yarn, etc., to resist tearing and/or puncturing. Other suitable examples include woven nylon yarn, e.g., nylon, polyether ether ketone (PEEK), polyetherketoneketone (PEKK), polyester, or any other suitable polymer. The woven polymer may include a coating such as silicone, neoprene, urethane, polyorganosiloxane, etc.

The airbag 52 may be a single continuous unit, e.g., a single piece of fabric. As another example, the airbag 52 may include a plurality of segments, i.e., two or more. The segments may be attached to each other in any suitable fashion, e.g., a plurality of panels attached by stitching, ultrasonic welding, etc.

With continued reference to FIGS. 4A-4B, the airbag 52 may extend along the longitudinal axis R1 in the inflated position. For example, the airbag 52 may extend from the first slider 18a to the second slider 18b. As another example, the airbag 52 may be spaced from at least one of the sliders 18. The airbag 52 may extend annularly about an axis L that is generally parallel to the longitudinal axis R1. That is, the airbag 52 may define an opening 60 extending circumferentially about the axis L. The opening 60 may extend from one end of the airbag 52 to the other end of the airbag 52. The opening 60 may be sized to receive the cable 22. For example, the cable 22 may pass through the opening 60 of the airbag 52.

The airbag 52 may be attached to the sliders 18 at the opening 60. Attaching the airbag 52 to the sliders 18 at the opening 60 may assist in maintaining a position of the airbag 52 relative to the cable 22 while allowing the airbag 52 to inflate to the inflated position. The airbag 52 may be attached to the sliders 18 in any suitable manner, e.g., adhesive, ultrasonic welding, etc.

The airbag 52 may, for example, be disposed in the cover 56 in the uninflated position, as shown in FIG. 4A. In other words, the cover 56 may cover the airbag 52 in the uninflated position. The inflated position may be the position of the airbag 52 at the end of inflation by the inflators 54, i.e., just before the inflators 54 are exhausted. In the inflated position, the airbag 52 may extend through the cover 56, e.g., the tear seam 58 adjacent to the airbag 52, as shown in FIG. 4B. In this situation, the airbag 52 may extend radially outward from the cable 22.

With reference to FIGS. 5A-5B, the airbag 52 may include an inboard-facing panel 62 and an outboard-facing panel 64 facing in opposite directions in the inflated position. The inboard-facing panel 62 and the outboard-facing panel 64 are connected to each other. The inboard-facing panel 62, in the inflated position, may, for example, be disposed between the cable 22 and the rocker 16. In other words, the inboard-facing panel 62 may face the rocker 16 in the inflated position. The inboard-facing panel 62, in the inflated position, may, for example, abut the rocker 16.

The outboard-facing panel 64, in the inflated position, may, for example, be positioned to receive and be impacted by an object. In other words, the outboard-facing panel 64 may face away from the electric vehicle 10. The outboard-facing panel 64 may be referred to as "an impact panel." The cable 22 may be disposed between the outboard-facing panel 64 and the rocker 16 in the inflated position.

The inflators 54 are in fluid communication with the airbag 52. The inflators 54 may be spaced from each other along the longitudinal axis R1, as shown in FIGS. 5A-5B. For example, the first inflator 54a may be disposed vehicle-forward of the second inflator 54b. In such an example, the first slider 18a may be disposed closer to the first inflator 54a than to the second inflator 54b, and the second slider 18b may be disposed closer to the second inflator 54b than to the first inflator 54a.

The inflators 54 expand the airbag 52 with inflation medium, such as a gas, to move the airbag 52 from the uninflated position to the inflated position. Upon receiving a signal from, e.g., a computer 70, the inflators 54 may initiate inflation of the airbag 52 with an inflatable medium, such as a gas, simultaneously. The inflators 54 may be supported by the rocker 16 or any other suitable component in the electric vehicle 10, e.g., the housings 34, 38, the floor, etc. The inflators 54 may be, for example, pyrotechnic inflators that ignite a chemical reaction to generate the inflation medium, stored gas inflators that release (e.g., by a pyrotechnic valve) stored gas as the inflation medium, or a hybrid. The inflators 54 may be, for example, at least partially in the inflation chamber to deliver inflation medium directly to the inflation chamber or may be connected to the inflation chamber through fill tubes, diffusers, etc.

Figure 6:
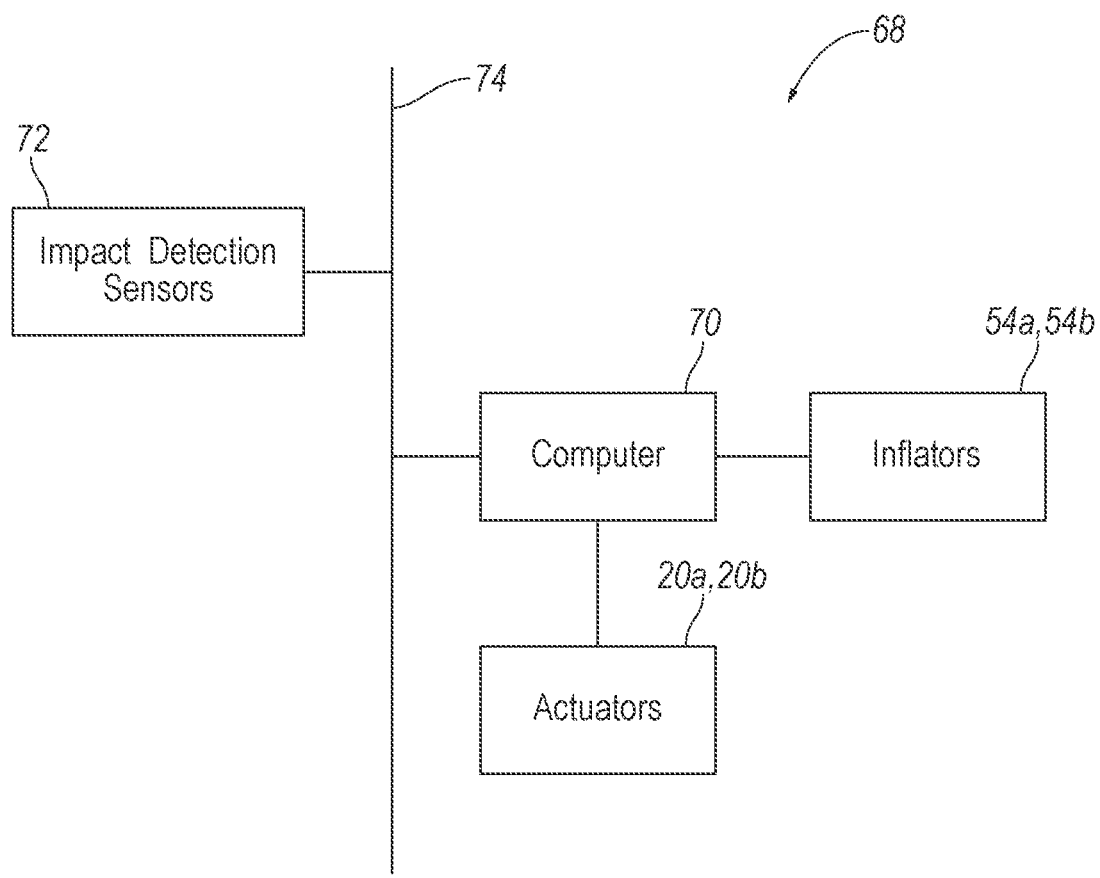
FIG. 6 is block diagram of a control system for the electric vehicle.

With reference to FIG. 6, the restraint system 12 may include a control system 68. The control system 68 may include the computer 70, an impact detection sensor 72, the actuators 20, and the airbag assembly 50, e.g., the inflators 54, in communication through a communication network 74.

The impact detection sensor 72 may be in communication with the computer 70. The impact detection sensor 72 is programmed to detect an impact to the electric vehicle 10. The impact detection sensor 72 may be of any suitable type, for example, post-contact sensors such as accelerometers, pressure sensors, and contact switches; and pre-impact detection sensors such as radar, lidar, and vision-sensing systems. The vision systems may include one or more cameras, CCD image sensors, CMOS image sensors, etc. The impact detection sensor 72 may be located at numerous points in or on the electric vehicle 10.

The computer 70 may be a microprocessor-based computing device implemented via circuits, chips, or other electronic components. The computer 70 may include a processor, memory, etc. The memory of the computer 70 may store instructions executable by the processor and the processor may read the instructions from the memory and execute the instructions. The computer 70 may be, for example, a restraint control module (RCM).

The control system 68 may transmit signals through the communications network 74 such as a controller area network (CAN) bus, Ethernet, Local Interconnect Network (LIN), and/or by any other wired or wireless communications network.

The computer 70 may be programmed to actuate the first and second actuators 20a, 20b in response to detecting a vehicle impact. For example, in response to receiving the signals from the impact detection sensor 72, the computer 70 may initiate the actuation of the first and second actuators 20a, 20b. In other words, in examples in which the impact detection sensor 72 detect a vehicle impact (or pre-impact), the computer 70 may send a signal to actuate the first and second actuators 20a, 20b. In this situation, the first and second actuators 20a, 20b discharge, which moves the first and second sliders 18a, 18b, respectively, in the vehicle-outboard direction along the lateral axis R2 to the deployed position, as set forth above. The computer 70 may actuate the first and second actuators 20a, 20b simultaneously.

The computer 70 may be programmed to selectively actuate the first and second actuators 20a, 20b based on information from the impact detection sensor 72 identifying the physical characteristics of the vehicle impact (or pre-impact), e.g., which side of the electric vehicle 10 is impacted, amount of pressure applied to the electric vehicle 10, etc. For example, the computer 70 may be programmed to actuate the first and second actuators 20a, 20b based on determining that the vehicle impact (or pre-impact) is a near-side impact, i.e., on a same side of the electric vehicle 10 as the assembly 14a.

As another example, the computer 70 may be programmed to prevent actuation of the first and second actuators 20a, 20b based on determining that the vehicle impact (or pre-impact) is a far-side impact, i.e., on the other side of the electric vehicle 10 than the assembly 14a. Additionally, or alternatively, upon determining that the vehicle impact (or pre-impact) is a frontal or rearward impact, the computer 70 can prevent actuation of the first and second actuators 20a, 20b in response to a detection of the vehicle impact (or pre-impact). In other words, in examples in which the impact detection sensor 72 detects a far-side, frontal, or rearward vehicle impact (or pre-impact), the computer 70 may send a signal to prevent actuation of the first and second actuators 20a, 20b. Alternatively, the computer 70 may not send a signal to the first and second actuators 20a, 20b upon detecting the far-side, frontal, or rearward impact (or pre-impact).

The computer 70 may be programmed to control inflation of the airbag 52 in response to detecting the vehicle impact (or pre-impact). For example, in response to receiving the signals from the impact detection sensor 72, the computer 70 may initiate the inflation of the airbag 52. In other words, in examples in which the impact detection sensor 72 detects a vehicle impact (or pre-impact), the computer 70 may send a signal to actuate the inflators 54. In this situation, the inflators 54 discharges inflation medium, which inflates the airbag 52. The computer 70 may, for example, initiate actuation of the actuators 20 prior to initiating inflation of the airbag 52. That is, the computer 70 may send a signal to initiate actuation of the first and second actuators 20a, 20b prior to sending a signal to initiate inflation of the airbag 52. As another example, the computer 70 may initiate actuation of the first and second actuators 20a, 20b and inflation of the airbag 52 simultaneously.

The computer 70 may be programmed to selectively initiate the airbag 52 based on information from the impact detection sensor 72 identifying the physical characteristics of the vehicle impact (or pre-impact), e.g., a direction of the vehicle impact, amount of pressure applied to the electric vehicle 10, etc. For example, the computer 70 may be programmed to initiate inflation of the airbag 52 in examples in which the computer 70 is programmed to initiate actuation of the actuators 20. As another example, the computer 70 may be programmed to prevent inflation of the airbag 52, e.g., in substantially the same manner as discussed above regarding preventing actuation of the actuators 20, in examples in which the computer 70 is programmed to prevent actuating the actuators 20.

Computing devices, such as the computer 70, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

During a vehicle side-impact, an object impacts the electric vehicle 10, and causes vehicle components to move inboard along the lateral axis R2, i.e., towards the electric-vehicle battery 24. Since the cable 22 is under tension prior to the impact, the cable 22 distributes a force from the impact to the ends 30, 32 of the rockers 16. Specifically, the cable 22 remains attached to the sliders 18 during the vehicle impact. The tension of the cable 22 results in the cable 22 opposing movement of the object towards the electric-vehicle battery 24 to reduce the likelihood that vehicle components impact the electric-vehicle battery 24.

The disclosure has been described in an illustrative manner, and it is to be understood that the terminology which has been used is intended to be in the nature of words of description rather than of limitation. Numerical adjectives, e.g., "first," "second," "third," and "fourth," are used herein merely as identifiers and are not intended to indicate order or importance. Many modifications and variations of the present disclosure are possible in light of the above teachings, and the disclosure may be practiced otherwise than as specifically described.

What is claimed is:

1. An assembly comprising:
   a rocker elongated along a longitudinal axis;
   a first slider supported by the rocker;
   a second slider supported by the rocker and spaced from the first slider along the longitudinal axis;
   a first actuator configured to slide the first slider relative to the rocker along a lateral axis;
   a second actuator configured to slide the second slider relative to the rocker along the lateral axis;
   a cable extending from the first slider to the second slider; and
   an airbag supported by the cable and being inflatable to an inflated position.

2. The assembly of claim 1, wherein the cable is fixed to the first and second sliders, the cable being under tension between the first and second sliders.

3. The assembly of claim 1, wherein the cable and the airbag are disposed outboard of the rocker relative to the lateral axis.

4. The assembly of claim 1, wherein the airbag extends annularly around the cable, the airbag extending from the first slider to the second slider.

5. The assembly of claim 1, further comprising a cover supported by the cable and including a tear seam, wherein the cover encloses the airbag in an uninflated position, and the airbag extends through the tear seam in the inflated position.

6. The assembly of claim 1, further comprising a first inflator in fluid communication with the airbag and a second inflator in fluid communication with the airbag, the first and second inflators being supported by the rocker and spaced from each other along the longitudinal axis.

7. The assembly of claim 1, further comprising an electric-vehicle battery supported by the rocker, the rocker disposed between the cable and the electric-vehicle battery.

8. The assembly of claim 7, wherein the first and second sliders are slidable in a direction away from the electric-vehicle battery.

9. The assembly of claim 1, wherein the cable is disposed outboard of the rocker relative to the lateral axis.

10. The assembly of claim 1, wherein the first and second sliders are slidable in a vehicle-outboard direction relative to the lateral axis to a deployed position.

11. The assembly of claim 10, wherein the cable is spaced farther from the rocker when the first and second sliders are in the deployed position than when the first and second sliders are in an undeployed position.

12. The assembly of claim 1, further comprising a computer including a processor and a memory storing instructions executable by the processor to:
   control actuation of the first and second actuators in response to a vehicle impact; and
   control inflation of the airbag in response to the vehicle impact.

13. The assembly of claim 12, wherein the instructions further include instructions to initiate actuation of the first and second actuators prior to initiating inflation of the airbag.

14. The assembly of claim 1, wherein the rocker is disposed between the first slider and the second slider.

15. The assembly of claim 1, wherein the rocker includes a front end and a back end spaced from the front end along the longitudinal axis, the first slider being disposed at the front end, and the second slider being disposed at the back end.

16. The assembly of claim 1, further comprising a first housing supported by the rocker and a second housing supported by the rocker, wherein the first slider is slidably engaged with the first housing, and the second slider is slidably engaged with the second housing.

17. The assembly of claim 16, wherein the first slider includes a first end disposed external to the first housing, and the second slider includes a first end disposed external to the second housing.

18. The assembly of claim 16, wherein the rocker includes a front end and a back end spaced from the front end along the longitudinal axis, the first housing being disposed at the front end, and the second housing being disposed at the back end.

19. An assembly comprising:
   a rocker elongated along a longitudinal axis;
   a first slider supported by the rocker;
   a second slider supported by the rocker and spaced from the first slider along the longitudinal axis;
   a first actuator configured to slide the first slider relative to the rocker along a lateral axis;
   a second actuator configured to slide the second slider relative to the rocker along the lateral axis;
   a cable extending from the first slider to the second slider;

an airbag supported by the cable; and a computer including a processor and a memory storing instructions executable by the processor to:

control actuation of the first and second actuators in response to a vehicle impact; and control inflation of the airbag in response to the vehicle impact.

20. The assembly of claim 19, wherein the instructions further include instructions to initiate actuation of the first and second actuators prior to initiating inflation of the airbag.

* * * * *